US008798376B2

(12) United States Patent
Bendahan et al.

(10) Patent No.: US 8,798,376 B2
(45) Date of Patent: Aug. 5, 2014

(54) ALGORITHM FOR DETECTING CONTOUR POINTS IN AN IMAGE

(75) Inventors: Remy Bendahan, Antibes (FR); Sylvain Bougnoux, Vallauris (FR); Frederic Abad, Valbonne (FR); Dzimitry Tsishkou, Antibes (FR); Christophe Vestri, Saint-Laurent-du-Var (FR); Sebastien Wybo, Valbonne (FR)

(73) Assignee: IMRA Europe S.A.S., Sophia Antipolis Cedex (FR)

( * ) Notice: Subject to any disclaimer, the term of this patent is extended or adjusted under 35 U.S.C. 154(b) by 894 days.

(21) Appl. No.: 12/881,472

(22) Filed: Sep. 14, 2010

(65) Prior Publication Data

US 2011/0069887 A1 Mar. 24, 2011

(30) Foreign Application Priority Data

Sep. 18, 2009 (FR) ...................................... 09 04480

(51) Int. Cl.
*G06K 9/48* (2006.01)
(52) U.S. Cl.
USPC ......................................................... 382/199
(58) Field of Classification Search
USPC ......................................................... 348/627
See application file for complete search history.

(56) References Cited

U.S. PATENT DOCUMENTS

| 4,876,729 | A | * | 10/1989 | Watanabe et al. | 382/199 |
| 5,832,140 | A | * | 11/1998 | Stapleton et al. | 382/298 |
| 6,583,897 | B1 | * | 6/2003 | Harrington | 358/532 |
| 6,668,080 | B1 | * | 12/2003 | Torr et al. | 382/173 |
| 2003/0086614 | A1 | * | 5/2003 | Shen et al. | 382/199 |
| 2003/0156751 | A1 | * | 8/2003 | Lee et al. | 382/154 |
| 2004/0189642 | A1 | * | 9/2004 | Frisken et al. | 345/443 |
| 2005/0123189 | A1 | * | 6/2005 | Bayer et al. | 382/154 |

OTHER PUBLICATIONS

Ketcham, Kirk; "Automated Crack Indentification for Cement Paste"; Apr. 1993, A Report on Research Sponsored by the Air Force Office of Scientific Research, pp. 13-75.*

* cited by examiner

*Primary Examiner* — Chan Park
*Assistant Examiner* — Elisa Rice
(74) *Attorney, Agent, or Firm* — Christopher P. Maiorana, PC

(57) ABSTRACT

A method for detecting contour points of an object in an image obtained by a video camera comprising the steps of: (i) selecting a scan line of the image; (ii) identifying minimum intensity differences called transitions between pixels of the selected scan line; (iii) identifying plateaus at both ends of the identified transitions; (iv) determining contour points of the object between the identified plateaus; (v) generating a descriptor of the contour in one dimension; and (vi) beginning again with step (i) by selecting another scan line of the image according to a predefined order.

16 Claims, 1 Drawing Sheet

ALGORITHM FOR DETECTING CONTOUR POINTS IN AN IMAGE

Figure 1:
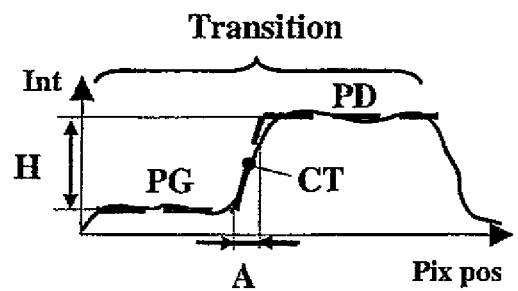

This application claims the benefit of French Application No. 09 04480, filed Sep. 18, 2009, which is hereby incorporated by reference.

DESCRIPTION

1. Technical Field

The technical field of the invention generally relates to sensors of obstacles based on monocular vision with low computing power image processing, and more particularly relates to an algorithm for detecting object contours. The invention may particularly be suitable for the automotive industry.

2. State of the Prior Art

Different methods for obstacle detection are known in the prior art.

The document of Tomasi and Kanade, entitled "Detection and tracking of point features", presents a detector of characteristic points of an image and an algorithm allowing these points to be localized in a succession of images. The characteristic points of these images are not invariant relatively to a change in scale of the image and further are not suitable with smooth images, i.e. containing objects not having sharp contours. Further, the representation of these characteristic points cannot used for matching the characteristic points with each other.

Document GB2218507 presents a detector of characteristic points of an image. The detected characteristic points are not invariant upon a change in scale of the image and further are not suitable with smooth images. The representation of these characteristic points cannot be used for matching characteristic points.

Document U.S. Pat. No. 6,711,293 presents a method for identifying invariant characteristic points at the scale of the image in order to localize an object in the image. The identified characteristic points are not located at the ends of the image. As the contours of objects correspond to the ends of the image, the distance, the shape and the measurements of three-dimensional objects reconstructed with such characteristic points remain local and irrelevant, insofar that they do not provide a global vision of these objects. The high dimensionality of such a descriptor is a drawback for achieving rapid matching consuming little resources. Indeed, the use of such a method in an automotive application with a low power central processing unit would generate much too long processing time.

Document WO2007128452 presents a detector of a point of interest. Like the previous document, the detected points of interest are not located on the contours of the objects. This is why they are useful for reconstructing an object in an image.

Within the scope of the present invention, it was noticed that existing detector solutions all had a certain number of drawbacks. Generally, the image processing time required for extracting characteristic points is too long and the use of a descriptor with a two-dimensional or three-dimensional shape requires a powerful high frequency processor. Further, the extracted characteristic points are generally not very relevant for matching and reconstructing the image.

More particularly, it will be noted first of all that the extractors of two-dimensional points have certain drawbacks. Thus, during the superposition of two objects in occultation, such a 2D extractor will select erroneous points so that the reconstruction of an image on the basis of this point will inevitably lead to an erroneous reconstructed image. A 2D extractor cannot provide a sufficient number of characteristic points for many man-made objects, such as for example the body of a car, a post, etc. . . . due to the homogeneous nature of these objects. Such objects cause the detection of a large number of erroneous points which prove to be detrimental for reconstruction. Another drawback of most methods for extracting characteristic points according to the prior art is the lack of relevance with view to their matching and reconstruction of the image. Indeed, many detected characteristic points are not localized on the contours and edges of the objects, which disrupt the reconstruction of the image. Further, it is not possible to detect characteristic points (point or curve) on a smooth edge. Accordingly, the matching strategy is generally disrupted when certain points are missing. Finally, it will further be noted that the 2D and 3D shape descriptors also have certain drawbacks. Indeed, the described 2D shape descriptors do not allow the characteristic points to be matched when the images are taken from different view points. Thus, when the object or the camera moves, when the perspective changes and when the object is seen differently on the different images, it is important to be able to match the different images, that the descriptor be invariant to this change in perspective (geometrical invariance) and in particular invariant relative to the scale of the object on the image. Further descriptors of characteristic points generally have too high dimensionality for simple and robust matching.

The many drawbacks of the extractors and descriptors of the prior art have shown the necessity of providing a rapid, reliable obstacle detection method and consuming low power so as to be able to process the information obtained in real time in a low frequency processor. For this, the need for a rapid method working both on the limits and on the surfaces of objects has been demonstrated within the scope of the present invention. Further, because of the use of monocular vision, with mainly forward/rear movements of the camera, it has appeared to be important to apply a robust method to the change in scale rather than rotation or inclination of the camera.

DISCUSSION OF THE INVENTION

The object of the invention is to find a remedy to the difficulties and drawbacks encountered with the systems for detecting and describing characteristic points of an image of the prior art. In particular, an object of the invention is to apply an algorithm for detecting contour points in an image by using a single wide-angle camera and by drastically reducing the processing time while continuing to detect all the obstacles.

For this purpose, according to a first aspect, the invention relates to a method for detecting contour points of an object in an image obtained by a video camera comprising the steps consisting of (i) selecting a scan line of the image; (ii) identifying the minimum differences in intensity called transitions between pixels of the selected scan line; (iii) identifying plateaus at both ends of the identified transitions; (iv) determining the contour points of the object between the identified plateaus; (v) generating a descriptor of the contour in one dimension; and (vi) beginning again with step (i) by selecting another scan line of the image according to a predefined order. The main advantage of this method lies in its very short processing time stemming from the intrinsic computing simplicity (one-dimensional scan line) and from the transformation into a 1D contour descriptor.

According to an embodiment of the method, the selected scan lines are epipolar lines. Preferably, the selected epipolar lines form a subset of scan lines extracted from the image rotating around the epipole, the number of scan lines being selected so as to cover at least one portion of the image. The use of epipolar geometry gives the possibility of providing invariance to changes in scale.

According to another embodiment of the method, during step (ii), the identification of the transitions is achieved by means of a gradual decimation approach detecting the transitions, from the roughest transition to the finest transition. Advantageously, decimation is stopped when the decimated scan line attains a minimum length or when a maximum decimation depth is reached.

According to another embodiment of the method, during step (ii), all the differences in intensity (DY) between the ends of monotonous intensity variations (i.e. between the ends of monotonous slopes) are extracted, a transition being identified when an extracted intensity difference exceeds a given threshold height.

According to another embodiment of the method, during step (iii), identification of the plateaus consists of finding the location of the two ends of each plateau and their characteristic intensity value. Preferably, the ends of a plateau are calculated by moving the initial ends of the identified transition towards the left and the right.

According to another embodiment of the method, during step (iii), the plateaus are defined relatively to each other without using any fixed threshold.

According to another embodiment of the method, during step (iv), the ambiguity of the transitions defined by the area between two identified plateaus is compared with a predefined ambiguity threshold, the transitions considered as non-ambiguous being kept for determining the contour points of the object.

According to another embodiment of the method, during step (iv), ambiguity reduction filters are applied to the transitions considered as ambiguous by adjusting the plateaus according to the shape of the ambiguity area.

According to another embodiment of the method, during step (iv), the smoothed/soft transitions are kept ambiguous.

According to another embodiment of the method, during step (v), non-ambiguous transitions are used for matching the corresponding contour points and generating a descriptor of the contour in one dimension.

According to another embodiment of the method, during step (v), the ambiguous transitions are retained in order to clear up the ambiguity upon matching the contour points.

According to another embodiment of the method, a step is provided consisting of reconstructing an image in three dimensions on the basis of contour descriptors in one dimension.

According to a second aspect, the present invention concerns a descriptor of one-dimensional shape applying the detection method according to the first aspect.

Other characteristics and advantages of the invention will become apparent from the following description of particular embodiments, given as examples, with reference to the appended drawings.

SHORT DESCRIPTION OF THE DRAWINGS

Figure 2:
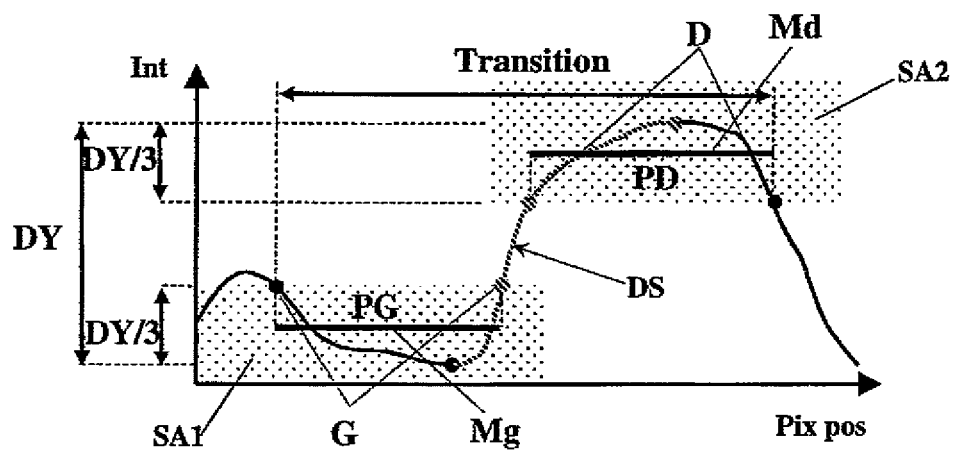
Figure 3:
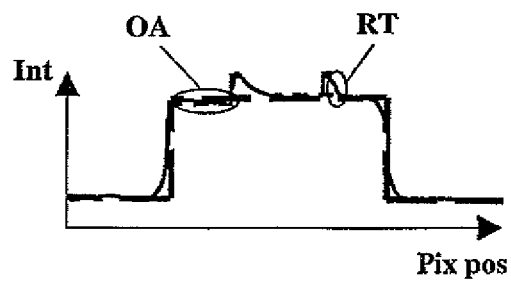

FIG. 1 schematically illustrates the definition of a transition;

FIG. 2 schematically illustrates the calculation for determining a transition;

FIG. 3 schematically illustrates an example of transitions extracted from a scan line.

DETAILED DISCUSSION OF PARTICULAR EMBODIMENTS

The invention will be described hereafter only as a non-limiting example in connection with FIGS. 1 to 3.

First of all, in order to well understand the method for detecting contour points of an object according to the present invention, it is necessary to explain the notion of transition in connection with FIG. 1. A transition models an edge or a contour between two different regions of the object to be detected. These regions are modeled by plateaus. Thus, a transition if defined by two right (PD) and left (PG) plateaus as shown in FIG. 1. The intensity difference between both plateaus is the height (H) of the transition while the distance between the two plateaus is called the ambiguity (A) of the transition. The height (H) represents the contrast of the transition and the ambiguity (A) represents its sharpness. The centre of the transition (CT) represents the sought contour point. These attributes are used for characterizing a transition. Thus, for example, a significant transition will have large plateau height and length, while a blurred transition will have a high ambiguity level.

In the perspective of detecting such transitions in an image, the present invention concerns a method for identifying, localizing and describing the contour points of the objects of the image by means of these transitions obtained from a one-dimensional signal. During image processing, the detector of contour points first requires calibration of the image, which is very rapid since it is carried out in a single dimension at a time, so as to be then adapted to dense reconstruction with the contour points, by statistically sorting out the most relevant points, i.e. those defining the main characteristics of the objects rather than the details of the objects.

This method first of all consists in a preliminary step for selecting any line of the image and preferably an epipolar line. Next, the method comprises three main steps, carried out at different image resolution levels. The first step consists in identifying intensity differences on the selected scan line, the second step consists in identifying plateaus around the measured intensity differences and the third step consists in determining transitions for the definition of contour points and reducing their ambiguity. The contour points are then matched in order to provide a descriptor of the contour in a dimension obtained by scalar measurements. Finally, it will be understood that these steps are applied recurrently on a certain number of scan lines with which the whole of the image may be covered so as to then, after matching and reconstructing the image on the basis of the 1D contour descriptors, generate a description of the contour in three dimensions. These steps will now be described in more detail in connection with FIG. 2.

The preliminary step consists in selecting scan lines which will be analyzed during the method for detecting the contours. For this, advantageously, a subset of epipolar lines is extracted from the image. Although any subset of epipolar lines may be used, provision is made for preferably scanning the image by taking the epipole as a centre and by performing a rotation with an angle pitch which may be variable, so as to focus on the areas estimated to be of interest depending on the intended application, and being at least one part of the area around of the image. The angle pitch selected for covering the area around the image or the selected area portion around the image may be a rough estimation in a first phase in order to rapidly determine the main contour points and may be subsequently selected more accurately for matching. An epipolar line may be considered as a one-dimensional intensity signal, designated hereafter as a scan line, more specifically this is a digitized segment. In an automotive application for obstacle detection with a camera attached to the rear of the vehicle, insofar that the latter essentially moves forward and rearward, the epipole is present in the image obtained by the camera.

Nevertheless it will be understood that the principle of the method applies in the same way regardless of the location of the epipole.

The first step is intended to roughly calculate the monotonous intensity variations (DY), i.e. the slope, along the scan line. This step is carried out with low resolution. For this, any decimation procedure may be used. Insofar that the length of the scan lines is variable, the decimation may be stopped when the scan line in the course of decimation reaches a minimum length or when a maximum decimation depth is reached. Next, all the slopes are extracted. Still during this first step, the transitions are identified by selecting the most relevant slopes, i.e. those having a change in intensity (DY) greater than a given threshold height. During the identification of the transitions, it is possible to take into account an average of pixels or to only take one pixel out of two or any other adequate combination of pixels. With this, it is possible to more rapidly carry out the detection of the relevant points and to be interested in the main characteristics of the image.

During the second step, the transitions are calculated by using the scan line with the highest resolution. Each transition is inferred by computing its left (PG) and right (PD) plateaus. The goal is to obtain two plateaus as close as possible, as long as possible, with heights as different as possible. The plateau calculation consists of finding the location of its two ends (G, D) as well as its characteristic intensity value (Mg, Md). The ends of the plateaus are determined by moving the initial ends of the identified slope (DS) towards the left and the right. For this purpose, the initial slope (DS) is cut into three areas (DY/3) along the Y axis. Each area defines a horizontal surface. The area of the middle (DS) is a vague area. Indeed, at this stage, it is not possible to know how to evaluate the pixel of this area. The two other areas (SA1 & SA2) are extended up to the minimum intensity (0), to the maximum intensity (conventionally 255) respectively. Implicitly, by performing this extension, the plateaus PG & PD) are defined relatively to each other without using any fixed threshold. All the successive pixels belonging to the first area (SA1) are assigned to the first plateau (PG), the successive pixels belonging to the third area (SA2) are assigned to the second plateau (PD), respectively. This process is stopped when the measured intensity value is outside the intensity search area (SA1, SA2), centered on the intensity value (Mg, Md) of each plateau. This plateau characteristic intensity value is obtained by averaging the intensity values of the pixels between the ends (G, D) of the plateau. It should be noted that the nearer to CT is the pixel of the plateau, greater will be the weight of its intensity in the calculation of the intensity of the plateau. It will be understood that many weighting schemes may be used, thus for example for a particular resolution of 640×480 pixels, it will be possible to use the first 20 pixels on either side of the transition.

During the third step, it is sought to extract the transitions which are the less ambiguous as possible. Insofar that the transition calculation procedure presented during the second step is simple, it is not desirable to take into account certain particularly irregular slopes, such as for example gentle slopes, oscillations, successive levels, Dirac functions, which would have the consequence of the occurrence of too ambiguous transitions. To do this, the determination of the transitions which may be used as well as the reduction in the ambiguity of certain other recoverable transitions may be accomplished according to the following criteria.

First of all, the transitions considered as non-ambiguous are kept. These non-ambiguous transitions are used for matching the contour points which they define so as to generate a one-dimensional contour descriptor along the relevant scan line and subsequently for reconstructing the image on the basis of these descriptors. It will be noted that the position of the camera as well as the movement of the vehicle have to be known in order to carry out this reconstruction. This is the case, since the camera is fixed, and the displacement of the vehicle may be known via odometric sensors on the vehicle.

Next, filters are applied to the other transitions with the purpose of recovering at least some of them. These filters have the purpose of reducing if possible the ambiguity of the transitions by adjusting their plateaus according to the shape of the ambiguity area. The ambiguity area is located between the right end of the left plateau and the left end of the right plateau. Considering both left (G) and right (D) ends, the total height (DY) of the transition, and also the absolute error between the signal and the left plateau (eg), the right plateau (ed) respectively, the ends (G & D) are first moved so that the errors (eg & ed) are balanced. Next, the ends (G & D) are in turn moved so that half of the total height DY is reduced, i.e. as long as DY(G, D)>DY/2.

Each filter is adapted to an irregular slope configuration. Thus for example, the oscillations may be retained during the first step. However, they may be damageable during reconstruction since it is difficult to determine among all the detected sub-slopes which is the main slope. It is then not easy to match an oscillating transition with a transition without any oscillation. This is why this type of erroneous situation should be avoided. For this purpose, the accumulation (RT) of counter-flow steps, i.e. every time that a step (y(x)−y(x−1) is of a sign opposite to the relevant slope, is measured at the ambiguity area as this is illustrated in FIG. 3. Once the accumulation is completed, the slope is not considered if the accumulation is such that |RT|>|DY/2|. Another example consists of finding a significant local step, if such a step is responsible for half of the DY area, then it is estimated to be significant and the ambiguity is reduced at its location. Another case occurs when the slope looks like a staircase provided with several steps. In this case, the staircase is recursively cut into individual steps.

As regards the smooth transitions it is important that they remain ambiguous, since their localization is vague which would cause erroneous reconstruction in the case of a localization error.

This is why the examples of filters presented above should not allow reduction in the ambiguity of smooth transitions, insofar that it is not possible to localize a significant intensity variation with such transitions. It will have been well understood that on the contrary, if ambiguity is low, the centre of the transition is accurate so that this transition is useful for matching contour points and subsequently for three-dimensional reconstruction of the image. Ambiguous transitions are however kept in order to reduce an ambiguity during matching. On the other hand, they are not used for reconstructing the image since they are poorly localized.

FIG. 3 schematically illustrates an example of transitions extracted from a scan line. The transitions are calculated individually, so that the plateaus of different transitions (OA) may overlap. As mentioned above, it is sought to extract the transitions which are the less ambiguous as possible. This is why it is not desirable to take into account certain particularly irregular slopes, such as for example oscillations, so that the initially extracted transition is rejected (RT) in order not to distort the image reconstruction.

The detection method described in details above has a certain number of advantages. In particular, the simplicity of the transition model allows an edge or an object contour to be modeled with few parameters such as the intensity level or height (contrast), the length (sharpness) and the location of the plateaus. These few suitably selected parameters are the key for efficient matching and for tracking the characteristic points.

The invariance to a change in perspective and more particularly the invariance to a change in scale will also be noted, which is desirable for matching contour points and therefore for reconstructing the image. Because the plateaus may be of any length, the descriptor may reconstruct the object from one image to the next without the penalty of limited and constant observation. Indeed, the correlation of the transitions should not be too sensitive to length variations. By experience, it was demonstrated that the number of transitions per scan lines was small (a few tens), and that the length modifications are quite distinct from poor matching. In other words, the lengths prove to be more important than colors for example. Moreover, as the object is only seen through a (1D) slice and described by a small number of parameters, these approximations considerably reduce the transformations due to a change in perspective. For all these reasons, this detection method and the associated descriptor may be considered as invariant to changes in perspective.

The invariance to photometric changes will also be noted because of the extraction of the image contours via transitions (relative intensity difference). The contours generally correspond to the limits of the actual physical objects. These limits do not vary with the changes in light, so that the localization of the contours in the image is invariant to photometric changes (for example due to strong lighting, to shadows, to changes in illumination . . . ).

The definition of our one-dimensional detector when it is combined with the epipolar constraint allows detection of the contour points in a very dense and relevant way. Indeed, the method according to the invention has a high response on artificial objects, i.e. man-made objects. The transitions are concentrated on the contours which generally delimit homogenous regions. The homogeneity of color is a common characteristic of artificial objects and of pedestrians (trousers or coat of a pedestrian, bumpers or body elements, posts, walls, etc.). Because of the variable length of the plateaus, it is possible to sort out large transitions from other smaller ones, so as to focus on the main characteristics of the scene rather than on details. This is important for obtaining an efficient approach from the roughest to the finest. Finally, the 1D detector according to the invention is less sensitive to erroneous points and is therefore more relevant.

Finally it will be noted that the extraction of smooth contours is possible insofar that by using the transitions it is possible to avoid being based on a calculation of the gradient, thereby making the algorithm robust and capable of extracting such smooth contours. However, the very smooth contours, although extracted, will not be used for the 3D reconstruction since they are generally ambiguous but on the other hand they may always be used for clearing up ambiguities during matching.

It will be understood that various modifications and/or improvements obvious to one skilled in the art may be brought to the different embodiments of the invention described in the present description without departing from the scope of the invention as defined by the appended claims.

The invention claimed is:

1. A method for detecting contour points of an object in an image comprising the steps of:
   (i) selecting a line through said image;
   (ii) identifying a plurality of intensity differences between a plurality of pixels along said line;
   (iii) identifying one or more transitions by comparing said intensity differences to a threshold height;
   (iv) identifying a plurality of plateaus in response to said transitions, two of said plateaus surrounding each of said transitions;
   (v) determining one or more of said contour points of said object by identifying said pixels centered between adjacent pairs of said plateaus;
   (vi) generating a descriptor of each of said contour points in one dimension; and
   (vii) beginning again in step (i) by selecting another line of said image according to a predefined order.

2. The method according to claim 1, wherein said line and said other line are epipolar lines turning around an epipole in said image.

3. The method according to claim 2, wherein (i) said epipolar lines form a subset of a plurality of given lines extracted from said image and (ii) a number of said given lines cover at least one area of interest in said image.

4. The method according to claim 1, further comprising the step of:
   decimating a number of said pixels in said line prior to said identification of said intensity differences.

5. The method according to claim 4, wherein said decimating is stopped when said line as decimated reaches a minimum length or when a maximum decimation depth is reached.

6. The method according to claim 4, wherein said identifying of said transitions is performed using all of said pixels in said line.

7. The method according to claim 1, wherein said identifying of said plateaus includes establishing a search area on each side of each of said transitions.

8. The method according to claim 7, wherein a plurality of widths of said plateaus are calculated by moving along said line away from a plurality of initial ends where said transitions enter said search areas.

9. The method according to claim 7, wherein pairs of said search areas are defined relatively to corresponding heights of said intensity differences.

10. The method according to claim 1, further comprising the step of:
    identifying one or more non-ambiguous ones of said transitions by comparing each area between said adjacent pairs of said plateaus with an ambiguity threshold, wherein said non-ambiguous transitions are used in said determining of said contour points of said object.

11. The method according to claim 10, further comprising the steps of:
    filtering said transitions considered as ambiguous by adjusting widths of said plateaus.

12. The method according to claim 11, wherein one or more of said transitions are kept ambiguous.

13. The method according to claim 10, wherein said non-ambiguous transitions are used in said generating of said descriptors, the method further comprising the step of:
    matching said contour points in said image to corresponding contour points in another image.

14. The method according to claim 13, wherein ambiguous ones of said transitions are used to reduce ambiguity in said matching of said contour points in said image with said corresponding counter points in said other image.

15. The method according to claim 14,
    further comprising the step of:
    reconstructing a representation of said object in three dimensions on the basis of said transitions defined in said one dimension.

16. An apparatus configured to apply the method according to claim 1.

* * * * *